Sept. 19, 1967  R. J. PRESLEY  3,342,416
WELDING TORCH APPARATUS
Filed June 17, 1966  2 Sheets-Sheet 1
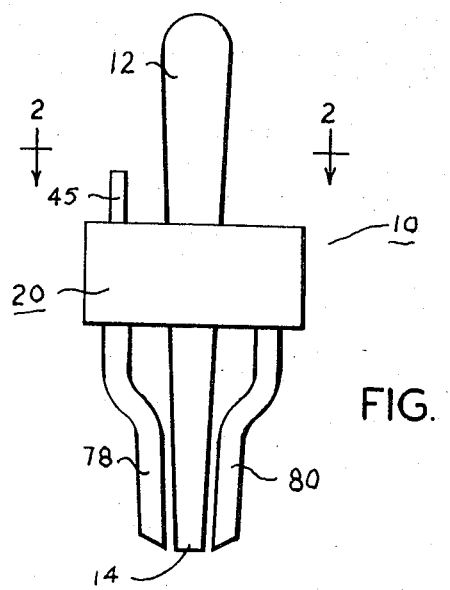
FIG. 1
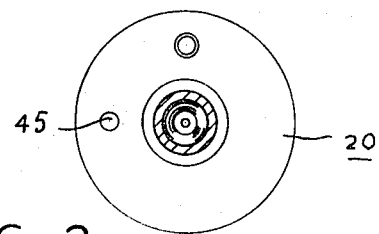
FIG. 2
FIG. 3
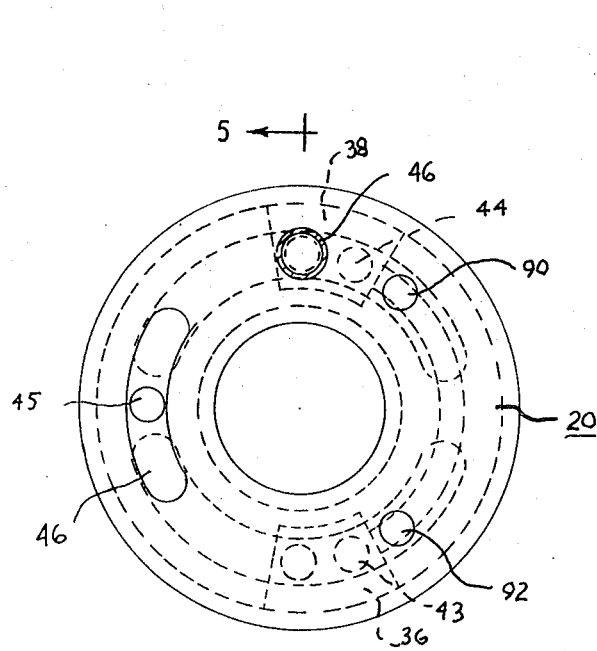
FIG. 4
INVENTOR.
RANDOLPH J. PRESLEY
BY 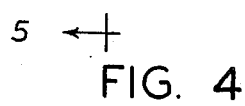
ATTORNEY INVENTOR.
RANDOLPH J. PRESLEY
BY
*M. A. Hobbs*
ATTORNEY

United States Patent Office 3,342,416
Patented Sept. 19, 1967

3,342,416
WELDING TORCH APPARATUS
Randolph Jennings Presley, 1508 Sheldon Ave.,
Grand Haven, Mich. 49417
Filed June 17, 1966, Ser. No. 558,406
9 Claims. (Cl. 239—132)

The present invention relates to a welding torch apparatus and more particularly to a welding torch having means for selectively cooling predetermined areas on either side or around the torch flame to protect the metal away from the area being welded from excessive heat.

In the conventional welding processes, it is often necessary to make a seam in a depression, recess or groove or along an area having an upstanding wall or section which is relatively close to the torch flame. When the welding operation is performed under these conditions, the metal on either side of the seam which projects upwardly or outwardly along one or both sides of the flame in close proximity thereto, becomes excessively hot and is often distorted, stretched, or otherwise damaged, and hence must be treated, refinished, or reprocessed after completion of the welding operation. Further, when welding a seam on a flat surface, such as on an automobile body, a relatively large area on either side of the seam is normally but unnecessarily heated, thus warping the metal and destroying the surface finish. In welding some types of structures, the metal being welded is in close proximity to an inflammable or easily fusable part which if ignited or fused would result in serious damage to the structure or require replacement of the part. It is therefore one of the principal objects of the invention to provide a welding torch apparatus which provides one or more jets of air or inert gas on one or both sides or around the torch flame for maintaining the material away from the flame sufficiently cool to prevent damage thereto.

Another object of the invention is to provide a welding torch apparatus having one or more air or inert gas jets, in which the jet can be easily and effectively placed at various positions around the torch flame, i.e. on either side or in front or at the rear of the flame, and from which the flow of air or inert gas can be regulated to supply a relatively large volume of air or gas on one side and relatively little or no air or gas on the other side, so that a rather uniform cooling action can be obtained regardless of variations in the surface contour on either side of the torch.

Still another object of the invention is to provide a relatively simple, easily handled welding torch having an area cooling means, which can be readily adjusted and positioned to give the required distribution and volume of air or inert gas while the welding operation is being performed to thereby adapt to changing surface contours along the welding.

A further object is to provide a welding torch apparatus of the aforesaid type which permits effective welding in close proximity to areas or parts easily damaged by the flame, such as painted areas, rubber gasket and trim parts, and glass windows, and which permits the use of delicate, temperature sensitive tools in close proximity to the flame without causing damage to the tools, or burning or otherwise injuring the operator handling or holding the tools.

Additional objects and advantages of the invention will become apparent from the following description and accompanying drawings, wherein:

FIGURE 1 is a front elevational view of a welding torch apparatus having the present cooling means incorporated therein;

FIGURE 2 is a horizontal cross sectional and partial plan view of the apparatus shown in FIGURE 1, the section being taken on line 2—2 of the latter figure;

FIGURE 3 is a plan view of the bottom of the apparatus shown in FIGURE 1;

FIGURE 4 is an enlarged top plan view of the cooling means of the apparatus shown in FIGURE 1;

Figure 5:
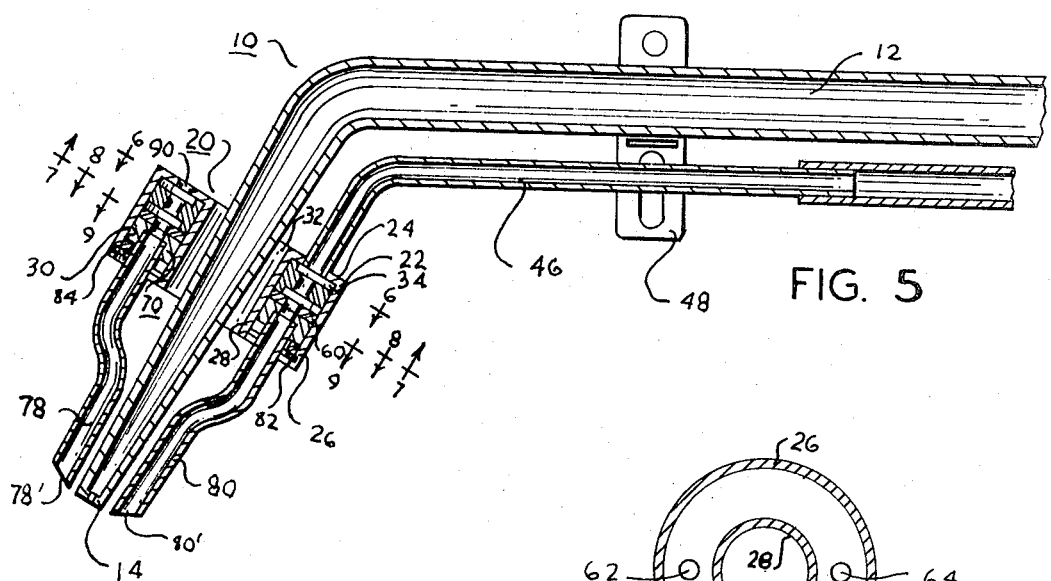
FIGURE 5 is a vertical cross sectional view of the apparatus shown in FIGURE 1.
Figure 8:
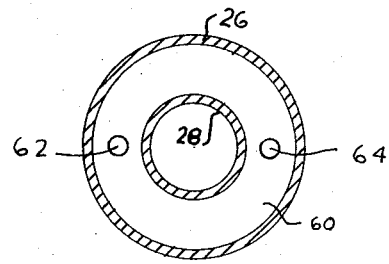
FIGURE 8 is a cross sectional view taken on line 8—8 of FIGURE 5.
Figure 6:
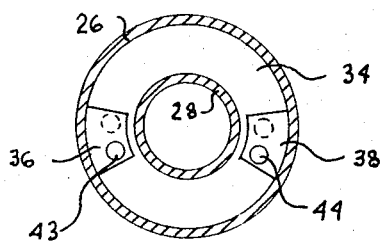
FIGURE 6 is a cross sectional view taken on line 6—6 of FIGURE 5.
Figure 9:
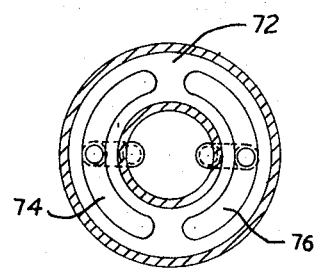
FIGURE 9 is a sectional view taken on line 9—9 of FIGURE 5.
Figure 7:
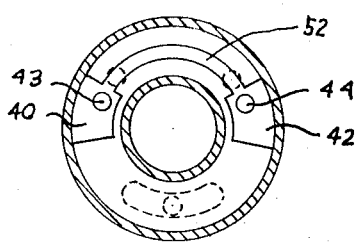
FIGURE 7 is a cross sectional view taken on line 7—7 of FIGURE 5.

Referring more specifically to the drawings, numeral 10 designates generally the present welding torch apparatus having a tube 12 for delivering acetylene or other combustible gases to jet 14. The tube and jet, 12 and 14 may, for the purpose of the present invention, be considered conventional, and the present cooling means may be used in conjunction with torches of different types, configurations and designs.

The present cooling means is designated by the numeral 20 and consists of a housing 22 having an annular shaped top 24, an outer wall 26, and an inner wall 28 spaced from said outer wall and joined to top 24 to form an annular chamber 30. The inner wall defines an opening 32 through which jet 14 extends in spaced relation to said wall. Disposed in chamber 30 of housing 22 is a rotatable disc 34 having opposed slots 36 and 38 on its upper side and slots 40 and 42 on its lower side, slots 36 and 40 being connected by hole 43 and slots 38 and 42 being connected by hole 44. This plate is used in controlling the flow of fluid and is controlled by a handle 45 extending upwardly from the plate through a slot 46 in the top. Air or any other suitable gaseous coolant, such as inert gas, is supplied to housing 22 by a tube 46 connected at one end to a suitable source of gaseous supply and at the other end to a hole in the top 24 of housing 22, the tube 46 being disposed beneath tube 12 and held rigidly in place by a clip or fixture 48 secured rigidly to the two tubes. The tube supports the cooling means around jet 14. While air and other gases, such as an inert gas, may be used in the present cooling means, for the purpose of the description in the specification and claims, the gas will be referred to as "air," since air is normally the material used in the present apparatus.

The air entering the housing enters slot 36 and passes through opening 43 into slot 40, and thence through an arcuate slot 52 to slot 42. A stationary plate 60 is rigidly mounted in chamber 30 beneath rotatable plate 34 and contains two openings 62 and 64 for communicating with slots 40 and 42, respectively. A rotatable assembly 70 is mounted in the lower part of chamber 30 and consists of a rotatable plate 72 having two arcuate slots 74 and 76 therein for communicating with holes 62 and 64, respectively. Two air nozzles 78 and 80 are connected to said plate 72 and communicate with slots 74 and 76, respectively, and project downwardly from housing 22 to a point adjacent the outlet end of jet 14. The air flowing through tube 46 enters chamber 30 and passes into slot 36, and thence through hole 43 to slot 40, and through hole 62 into slot 74, where it enters jet 78 and is discharged therefrom adjacent the end of nozzle 14. Air also passes through arcuate slot 52 to slot 42, and thence through hole 64 into slot 76 and into nozzle 80, and is discharged adjacent the outlet of jet 14. Plate 72 is held rotatably in place by a snap-ring 82 and a seal 84 disposed between plate 72 and snap-ring 82. With this construction, the two nozzles 78 and 80 and plate 72 can be rotated to any position around the entire circumference of jet 14 to place the outlets of 78' and 80' at any point where cooling is desired.

In order to regulate the flow of air through the nozzles and thereby control the amount of coolant in any particular location to meet cooling requirements in the structure adjacent the weld, plate 34 is rotated, for example in the clockwise direction, to partially cover hole 62. This rotation restricts the air entering slot 74 and nozzle 78 and simultaneously, the air continues to be supplied to nozzle 80 through passage 52 and slot 42. In order to avoid increasing the flow in the latter nozzle, an outlet opening 90 communicates with slot 42 to permit the outflow of excess air. Rotation of plate 34 in a counterclockwise direction restricts the flow through hole 64 and the excess air created by the restriction is discharged through outlet opening 92 in top 24.

In the operation of the present welding torch apparatus, the welder operates the torch in the same manner as in the conventional torch, but adjusts nozzles 78 and 80 to the location required to discharge coolant air on an area or areas to be protected. The two nozzles 78 and 80 are positioned by rotating them relative to jet 14. The amount of air discharged through the nozzles is then regulated and set by operating pin 45 which rotates plate 34 in either direction to restrict the flow in either nozzle 78 or 80 in the manner previously described herein. The present cooling means may be adjusted without difficulty throughout the operation of the welding apparatus, both by rotating the position of nozzles 78 and 80 and by adjusting the air flow to either of the nozzles by handle pin 45. The flow of air through the two nozzles 78 and 80 in close proximity to jet 14 readily and effectively cools the metal on either side of the area being welded, thus preventing the adjacent structure from being warped or stretched, or the surface coating from being damaged. The cooling means, including nozzles 78 and 80, can be positioned effectively along various irregular surfaces to provide an effective cooling film around the surfaces and structures adjacent to the weld.

While only one embodiment of the present invention has been described in detail herein, various changes and modifications may be made without departing from the scope of the invention.

I claim:

1. A welding torch apparatus comprising a jet for combustible gas, a nozzle for a coolant gas disposed adjacent to said jet, means for supporting said nozzle and for adjusting the position thereof around said jet, and means for varying the flow of coolant gas in accordance with requirements.

2. A welding torch apparatus as defined in claim 1, in which a second nozzle for a coolant gas is disposed adjacent the jet for combustible gas in a position substantially diametrically opposite to the first mentioned coolant gas nozzle.

3. A welding torch apparatus as defined in claim 2, in which the nozzle for the coolant gas defined in claim 2 is supported by the means for supporting the jet for combustible gas and is adjustable around the jet for combustible gas along with the first mentioned nozzle for coolant gas.

4. A welding torch apparatus as defined in claim 1, in which the means for supporting the nozzle for the coolant gas includes an annular housing having a central opening through which the jet for combustible gas extends.

5. A welding torch apparatus as defined in claim 2, in which the means for supporting the nozzles for the coolant gas include an annular housing having a central opening through which the jet for combustible gas extends.

6. A welding torch apparatus as defined in claim 5, in which the housing contains a rotatable plate for varying the flow to said two nozzles for coolant gas to thereby increase or diminish the flow of coolant gas relatively between the two coolant gas nozzles.

7. A welding torch apparatus as defined in claim 6, in which a control means is connected to said plate extending outwardly from said housing for adjusting the position of the plate and thereby adjust the relative flow of air through the two coolant gas nozzles.

8. A welding torch apparatus as defined in claim 7, in which the means for supporting the coolant gas nozzles consists of an annular member enclosed within said housing.

9. A welding torch apparatus as defined in claim 8, in which a tube supplies combustible gas to the jet and a tube disposed parallel to said first mentioned tube and connected thereto supplies a coolant gas to said housing.

References Cited

UNITED STATES PATENTS 2,207,655　7/1940　Cain _____ 239—290

FOREIGN PATENTS 858,769　12/1952　Germany.
11,900　6/1909　Great Britain.

M. HENSON WOOD, JR., *Primary Examiner.*

M. MAR, *Assistant Examiner.*